United States Patent [19]

Manser et al.

[11] Patent Number: 5,126,159
[45] Date of Patent: Jun. 30, 1992

[54] PROCESS FOR THE PRODUCTION OF DOUGH, PARTICULARLY FOR PASTE PRODUCTS

[75] Inventors: Josef Manser, Uzwil; Friedrich Egger, Niederuzil; Werner Seiler, Zuberwangen, all of Switzerland

[73] Assignee: Buehler AG, Uzwil, Switzerland

[21] Appl. No.: 381,730

[22] PCT Filed: Nov. 18, 1988

[86] PCT No.: PCT/CH88/00219
§ 371 Date: Jul. 5, 1989
§ 102(e) Date: Jul. 5, 1989

[87] PCT Pub. No.: WO89/04610
PCT Pub. Date: Jun. 1, 1989

[30] Foreign Application Priority Data
Nov. 27, 1987 [CH] Switzerland ............ 04627/87

[51] Int. Cl.⁵ .................. A23L 1/16; A21C 1/00
[52] U.S. Cl. .................. 426/549; 426/451; 426/504; 426/516; 426/518; 426/557
[58] Field of Search ............ 426/518, 549, 557, 451, 426/504, 516; 366/83

[56] References Cited

U.S. PATENT DOCUMENTS

| | | | |
|---|---|---|---|
| 1,083,275 | 1/1914 | Eberhard | 264/75 |
| 2,857,624 | 10/1958 | Hanzel et al. | 264/141 |
| 2,914,807 | 12/1959 | Robbins | 264/75 |
| 3,457,880 | 7/1969 | Eppenberger | 366/83 |
| 3,632,256 | 1/1972 | Kastings et al. | 264/349 |
| 3,861,287 | 1/1975 | Manser | 366/83 |
| 3,907,259 | 9/1975 | Leclercq | 366/83 |
| 4,269,582 | 5/1981 | Mella | 425/204 |
| 4,347,003 | 8/1982 | Anders | 366/83 |

Primary Examiner—Donald E. Czaja
Assistant Examiner—Mary S. Mims
Attorney, Agent, or Firm—McAulay Fisher Nissen Goldberg & Kiel

[57] ABSTRACT

The new invention suggests that the protein framework be developed in a continuously working 2-shaft kneading device (11) for the production of paste product dough without—as was previously required—a dwelling time of 10–15 minutes in a mixing trough. In so doing, a so-called dry and crumbly dough is formed. This is transferred to a directly adjoining single-shaft screw press (31) without the application of pressure if possible. The new installation accordingly comprises three characteristic process stages in a corresponding manner: a first whirling mixer (8) for the intimate mixing of the dry components with water, a 2-shaft kneading device (11), and a single-shaft press (31).

14 Claims, 6 Drawing Sheets

PROCESS FOR THE PRODUCTION OF DOUGH, PARTICULARLY FOR PASTE PRODUCTS

TECHNICAL FIELD

The invention is directed to a process and an installation for the production of dough, particularly for paste products, from starch and gluten protein containing raw materials such as flour, middlings or semolina, by means of moistening, mixing and kneading in such a way that the material does not, at least substantially, exceed a temperature of 50° C., and a gluten framework is fully developed in the dough.

BACKGROUND ART

A major part of the cereals intended for human nourishment in traditional processing is first processed in the ground state as flour, middlings or semolina in a dough form and only then in paste products (for cooking in water). Characteristic of this product group is the so-called gluten or protein framework which must be formed in the dough forming phase in order to provide the necessary strength for the subsequent processing and the finished products.

Also very popular is a multitude of special products which can likewise be prepared for human consumption, proceeding from the dough form, e.g. toasted, puffed or fried. In this category of special products it is also possible to use gluten-free or low-gluten raw materials such as maize, rice or potatoes, etc. In this case, for example, the properties of the thermally treated starch are made use of, instead of the gluten framework, in order that the finished products hold together. But in this case, also, a temperature which is substantially below 100° C. is applied in the dough phase, that is, there is no cooking process.

It is common to both product groups, particularly those produced from cereals, that they are subjected beforehand to some kind of heat treatment for human consumption, so that the recovered as completely as possible through digestion.

In its natural, whole state, a cereal gain has a cellular structure. As far as the flour material is concerned, this consists primarily of starch in crystalline form (70–75% TS) and of protein (10–15% TS), wherein there are different types of protein, some of which settles on the starch crystals, some of which is deposited between the individual starch granules, and 10–15% water. In microscopic section through a cereal grain left in its natural state the protein or gluten framework which provides the entire grain with its high strength can be seen very clearly by means of dying methods used especially for this purpose. During the grinding process, the dark shell parts are removed from the cereal grains, which are a few millimeters in size, and, depending on the requirements, the flour material is produced in definite granulations of from 0 to 500 μm. In so doing, the bonds which naturally exist between the flour and semolina particles are correspondingly destroyed.

The consumer expects classical paste products such as spaghetti, macaroni, noodles, etc. to be cooked in water within 7 to 15 minutes without a large portion of the starch passing into the cooking water and being thrown away with it. This can be prevented in that the outer covering of only a few starch gains is destroyed during the industrial processing, but also particularly in that a good protein framework is formed in the paste product during the dough formation and a large part of the protein enters into reticular bonds and locks in the starch grains. But in order for the required gluten framework to be produced, it must be ensured that the natural bonds still remaining not be destroyed or damaged and that new bonds be produced at all points of contact of the flour or semolina parts via the dough processing. This requirement gives the entire dough formation for paste products its determined character. Until the present time, there have been two widely recognized models for paste product dough production. One of these relates more to its realization in terms of apparatus. Semolina and water, as well as other additions, depending on the product, are poured into a mixing trough with a content of several hundred liters, possibly even 1000–2000 liters. The material is agitated and mixed with a paddle shaft for 10–15 minutes, so that the water and other additions are uniformly distributed through the entire amount of product and the individual flour and semolina parts are given sufficient time also to really absorb the water and so that the latter can penetrate into the individual particles. The uniform distribution and the water absorption thus make the aforementioned dwelling time of 10–15 minutes in a mixing trough compulsory. Product which is already moistened is removed from the mixing trough by means of transferring elements and guided into a screw press and kneading screw via a worm conveyor screw, which now, with the dough formation, should develop the gluten framework and should simultaneously build up a high pressure of 70–100 bar for the molding pressing. All experience has confirmed that the temperature of the products may not exceed 50° C. at any time during the dough formation in order to form a good gluten framework, assuming that the raw materials are faultless.

In the second, more economical model, the development of the gluten framework is conceived of as a result of the processing of the dough accompanied by relatively high pressures in the press screw, partly as biochemical process, since bonds occur among living protein, but partly also as a mechanical positively-guided movement process in order to provide favorable positions of the protein for new bonds by means of spatial displacement of all particles. The biochemical process is a function of the temperature and of sufficient water being made available. Until the present time, it has sometimes been a matter of dispute as to which specific types of protein are predominantly active, particularly for the new bonds. In natural grain, the gluten protein already consists of fibrous molecular formations which provide the entire grain with its mechanical strength due to a large number of bonds. However, a portion of these bonds is destroyed by means of the grinding process and the production of flour and semolina particles. If an additional 10–20% water is now added to the dry raw material consisting of flour, semolina or middlings, etc. with a water content of 10–15% and the mass is subjected to a mechanical pressure deformation process, the fibrous protein molecules are stretched and new bonds are formed simultaneously via sulfur and hydrogen groups, part of which have settled on the protein molecules. To the extent that it is possible to produce the new bonds as completely as possible especially via the sulfur groups, the greater the extent to which the inherent strength of the original grain can be given back to the newly composed piece of dough, e.g.

as paste product, along its entire cross section. But not only are new bonds produced in place of the natural bonds destroyed by means of the grinding process, they are also put into another form which is more suitable for mechanical processing (pressing) and subsequent thermal treatment (cooking) and which can be conceived visually as a spatial rubber band weave tissue. It is this which first gives the dough its inherent typical, elastic and plastic and non-sticky characteristic. If it is attempted to produce a dough with only 20% total water content, only an incomplete gluten framework can be constructed in the absence of sufficient water molecules independent of the kneading intensity. The paste products produced from this can form a dough clump in a short amount of time during cooking and, in this form, can be prepared as conventional paste products only in a poor manner. In addition, in products with insufficient protein framework, too much starch from the surface of the product is lost in the cooking water and the paste product becomes slimy and sticky on the surface.

In recent decades, very many attempts have been made to develop a simpler manner of managing dough precisely for paste products. In contrast to classic bread dough, paste product dough can be designated as dry dough with an average dough moisture of 28–35%. After pressing, the excess water (excess water quantity of 12–13%) must be removed again by means of a drying process, so that the product is storable. Bread dough has an average water content of 50–65%. A large portion of this water is evaporated during baking. However, a high percentage of water remains in the bread, which is why traditional bread in closed packaging is only storable for a few days at room temperature. Bread dough with a water content of 50–65% is designated here as wet dough. It is known even in cooking school that bread dough can be kneaded easier, particularly with less force (energy), because of the high water content.

Carrying over the "simpler" dough formation of wet dough to paste products would be economically senseless, since all additional water above the water required for the formation of the gluten framework and for giving it form would have to be evaporated again likewise by means of the thermal drying process, which is costly in terms of energy. All previous attempts at using a shorter, simpler dough producing method for paste products failed without exception, at least to the knowledge of the present Applicant, either because of inability to overcome technical problems or due to unacceptable damage to the quality of the end product. Also, due to given biochemical and physical factors, it may not be possible for a gluten framework which is insufficiently formed or damaged after the pressing to be "repaired" again by means of some kind of influences. In addition, if the product has heat damage, i.e. if the temperature of the product increased substantially above 50° C. during the dough formation, it is also no longer possible to guide the same product through the dough stage and press it again. This is why breading flour produced from already baked bread is unsuitable for using again as bread baking flour or raw material for paste products. During the dough formation, e.g. for paste products, biological factors must be taken into account. This means that high demands are placed on the raw materials as well as on the operation of the installations so that no sources of infection for harmful microorganisms are maintained or further increased. Particularly high demands are made in the production of paste products in which egg is added to the paste products. The critical point in this respect was previously the trough mixer because of the partially unmonitored dwelling time of the product in the rather moist climate, which is also optimal for harmful microorganisms. Therefore, the highest demands were placed on the trough mixer with respect to hygiene. The frequent cleaning is particularly time-consuming. With the use of chemical cleaning agents the cleaning process is only shifted to the cleaning of washing water. In any case, this leads to increased operating costs as well as increased product costs and corresponding production losses.

DISCLOSURE OF INVENTION

It is the object of the invention, particularly for the production of paste products, to eliminate the aforementioned disadvantages and enable a more economical plant management while simultaneously maintaining the best possible gluten framework in the produced dough.

All participating specialists who knew of or participated in the many attempts which have failed for decades were really surprised that a crumbly dough with an excellent gluten framework can be produced according to the new invention, for which e.g. a total of less than 1 minute is required, that is, virtually no dwelling time in the accustomed sense. As will be shown in the following, it is even possible with particularly advantageous constructions to produce a paste product of high quality from raw material until the freshly pressed state of the product in the range of 20–30 seconds, which will mean a substantial advance for the production of paste products in every respect, particularly with respect to hygiene. It can certainly be concluded from the new realizations that the previous model ideas for dough formation for paste product dough were at least incomplete and very imprecise.

In the production of wet doughs, it was already known that the gluten framework can be formed within the space of 10–30 seconds, but this was conceivable due to the excess of water. However, this is not the case with dry doughs. Because of the new invention, it is now concluded that for the formation of the gluten framework in a dry dough biological factors only play a part insofar as the life processes in the respective raw materials should not be impaired in terms of quality. Within these limits, the formation of an optimal gluten framework is only a chemico-physical process. Both processes, insofar as they can be mastered, take place within seconds. But the chemical process only takes place at the rate of seconds if corresponding optimal conditions are provided for the new creation of bonds, particularly for the sulfur and hydrogen groups. The physical processes are the prerequisite for the new chemical bonds. If the physical processes, i.e. the movements of the parts within the dough mass, proceed only at a sufficient speed, the chemical bonding processes need virtually no time.

The previous idea that the water distribution and the water absorption through the protein material requires time is false from the perspective of the new invention. The essential question is not the absorption of 12 to 20% water, e.g. via capillaries, etc. and the penetration into the flour or semolina particle and into the proteins, rather only how quickly the water can be distributed to all flour or semolina particles, which, as is known, is that much more difficult the smaller the added water quantity. But the new idea of the rapid and uniform moistening of the flours or semolinas, preferably in so-called continuous whirling moisteners, with no actual dwelling or acting time, accordingly proves to be far superior to the conceptual model of the trough mixer. In order to suffice for the required formation of homogeneously moist loose crumbs from the flour or semolina particles the water need only adhere to the surface of the flour or semolina particles. A continuous through system is clearly superior to the trough for a mere adherence of water to the individual particles of material. Possibly, in accordance with the course of the most recent developments in the production of bread dough, the large mixing trough will remain accepted in technical circles also for the production of dry dough while acknowledging the disadvantages connected therewith, especially for the paste products industry.

However, the new invention helps to mitigate two other previous problem areas in a fully unexpected manner. One concerns the inhomogeneity of the final product, the second, which is influenced in part by the latter, is the uniform delivery of the dough strands from the pressing mold. According to the new idea, the protein framework is developed prior to the high pressing pressure required for the definitive shaping.

The screw press required for shaping need now only maintain the homogeneity of the dry dough and build up the required pressure. But the product which is discharged in the pressing mold accordingly has an almost uniform temperature, so that the discharge speed is now substantially more constant along the entire pressing mold cross section. The cutting wastes due to products of different length, e.g. in spaghetti, can be sharply reduced in a corresponding manner.

The invention is directed further to a number of particularly advantageous constructions:

The gluten framework in the dry dough is preferably formed in a two-shaft kneading device with two self-cleaning, synchronously running shafts in less than 60 seconds, preferably less than 30 seconds, by means of kneading and working. This allows for a substantial step in the constructional realization of the new invention in that a self-cleaning device can be used instead of the previous cleaning-intensive mixing trough. Accordingly, not only are the corresponding costs dispensed with, but the most problematic part of the previous process management with respect to hygiene is eliminated.

In a particularly preferred manner for the formation of the gluten framework, the product is worked in a cutting/kneading process by means of co-rotating cutting/kneading tools, wherein the product is subjected to a cutting/kneading and working process in the second stage at least during 25% of the entire length with respect to time, preferably during 30–50%.

The division of the process into a plurality of steps which can be monitored individually makes possible various other advantages, in addition.

Thus, the temperature of the dough is preferably measured at the end of the second process step and is adjusted to a preselected value by means of adding water of a corresponding temperature during the moistening, and the working and kneading intensity is changed and influenced by means of regulating the speed.

However, product samples can also be removed after every stage, particularly before and after the dough formation, and can be checked directly or by way of the laboratory, so that specific corrective measures can also be taken during the processing in a corresponding manner.

The product transfer from the first to the second and from the second to the subsequent stages is preferably effected without the application of pressure, preferably by means of the force of gravity, which additionally facilitates the removal of samples and the monitoring and actual controllability of the process sequence.

But for the production of paste products with different solid or liquid ingredients such as tomatoes, spinach, pepperoni, etc., the new invention also allows the latter to be fed in during the second stage or directly in a subsequent third stage.

For the production of the particularly prominent classic uncooked paste products such as spaghetti, noodles, macaroni, etc., it is suggested to feed the crumbly dough directly into a screw press, to press it into the definitive shape with the required pressure build-up by means of a pressing mold, and to dry the product subsequently. Of course, it is possible to convert the freshly pressed paste products, into an at least partially or completely cooked product, instant product, etc., e.g. by means of steaming, and then to carry out the drying process.

For the purpose of an additional increase in hygiene, the water can be supplied as a first liquid component during input into the whirling mixer and an additional liquid addition, e.g. liquid egg, can be supplied as a second liquid component directly in the second stage.

The invention is directed further to an installation for the production of dough, particularly paste products, which are provided for a subsequent cooking process. This is characterized in that it comprises a two-shaft kneading device with two synchronously running, self-cleaning shafts. Synchronously running shafts have advantages over shafts which run in opposite directions. Surprising advantages have resulted particularly with regard to the quality of the dough when a 2-shaft kneading device is used for forming the crumbly dough and a single-shaft screw press is used for building up the pressing pressure.

In a particularly preferred manner, the installation for the production of paste products comprises elements for metering all liquid and dry components, a mixing unit, a separate kneading unit, a press and a drier, so that it preferably comprises three separately driven units, a first whirling mixer, a 2-shaft kneading device and a screw press and shaping screw for the formation of dough and the production of freshly pressed product, respectively. In this way, it is possibly economical, particularly in adhering to high hygienic requirements, to achieve a very good paste product quality, wherein the process can be monitored per se in every stage and corrections can be made more easily than could be done prior to the time of the present Application.

The invention is directed to a device for the production of dry dough with a favorably developed gluten protein framework which is characterized in that it comprises a preferably self-cleaning 2-shaft kneading device with two synchronously running shafts, co-rotating cutting/kneading tools, and draw-in screw element.

OUR DESCRIPTION OF THE INVENTION

The invention is now explained in further detail by means of several embodiment examples.

MODES OF CARRYING OUT THE INVENTION

Figure 1:
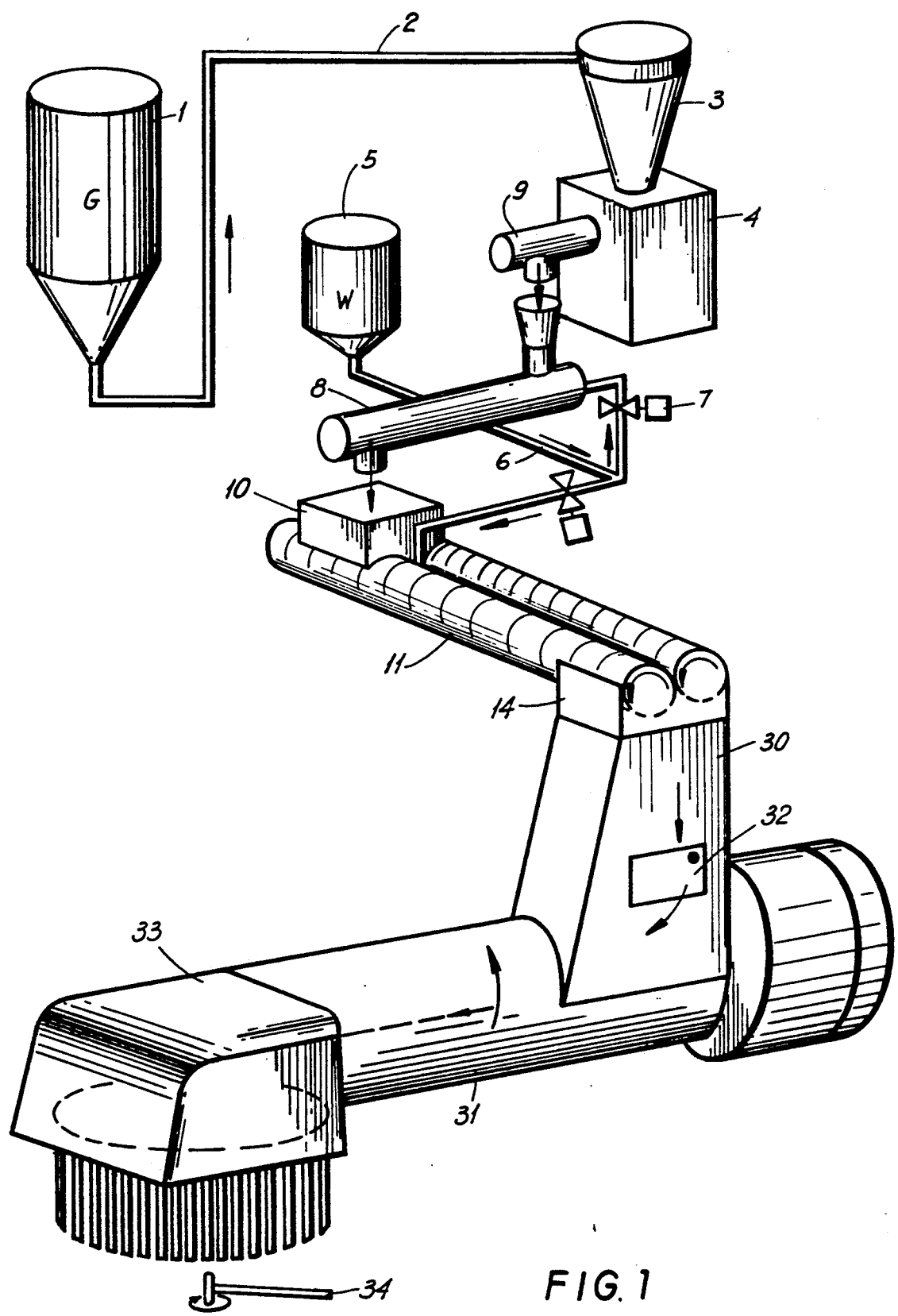
FIG. 1 shows the dough preparation for the production of paste products.
Figure 2:
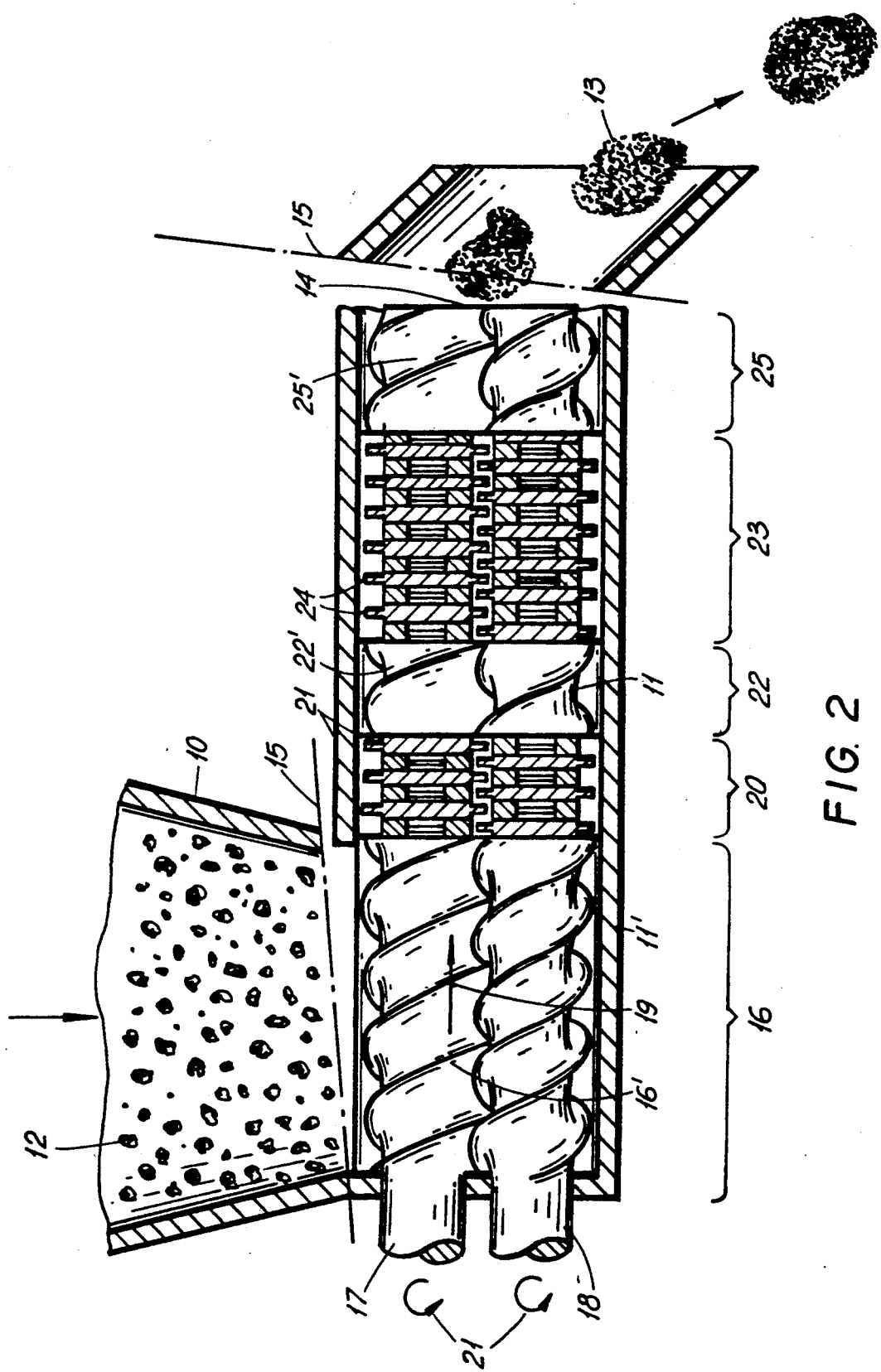
FIG. 2 shows the kneading and working device of FIG. 1 in enlarged scale with input and output of the product by means of the force of gravity.

FIGS. 1 and 2 are referred to in the following. The raw material is removed from a silo 1 in the form of semolina and fed into a preliminary container 3 and ten directly into the metering device 4 via a pneumatic transporting line 2. Water is metered directly into a whirling mixer 8 from a tank 5 via a line 6 and a quantity governor 7. The dry raw material is fed into the whirling mixer 8 in a uniform manner from the metering device 4 via a feed head 9. At the whirling mixer 8, the dry raw material is uniformly moistened and the crumbly loose material which is accordingly formed (FIG. 2) is directed into an inlet 10 of a kneading device 11. The kneading device 11 forms a crumbly dough 13 from loose crumbs 12 (see FIG. 2) by means of kneading and working. The crumbly dough consists of dough pieces of e.g. 1–5 cm, almost hand-sized pieces, in part, when the output end 14 of the kneading device 11 is completely free, and makes a crumbling, friable impression similar to the interior of a baked bread. But if the output end is narrowed in the manner of a nozzle, a "sausage" of similar constitution is formed, but as a continuous extruded form. However, in both instances, the crumbly dough does not yet have the constitution of a compact dough. That is, if a piece of the crumbly dough is torn off, the actual nature of the dough can easily be determined by the plastic- resilient and non-sticky characteristic. A microscopic examination shows that the crumbly dough 13 actually already has the full development of the protein framework. But since this is a matter of dry dough and the actual molding pressing pressure of e.g. 50–100 or more has not yet been applied, it only gives the appearance of an easily crumbling dough.

The crumbly dough formation proceeds as follows: the loose crumbs 12 having a uniform moisture are fed into a 2-kneading device 11 through an input. For a simpler understanding the actual kneading member 11' is shown in FIG. 2 in the preferred horizontal position, that is, as seen from the top. On the other hand, the input 10 and the output end are shown from the side, that is, in the upright position. In other words, the kneading member is shown tilted by 90° into the upright picture plane, which is indicated by the section lines 15 of the picture. The crumbs 12 are grasped by means of the draw-in screws 16' and draw-in zone 16, respectively, by two work shafts 17 and 18, respectively, and conveyed to the right, according to arrow 19, into a first kneading zone 20.

In the kneading zone 20, 3 pairs of co-rotating kneading fingers 21 are arranged on every working shaft 17 and 18, respectively. The two work shafts 17 and 18, respectively, rotate in the same direction (arrow 21) and mesh within one another similar to two worm-type toothed wheels. Accordingly, there is a two-fold effect: a conveying of the product (arrow 19) and a compression; in so doing, a dense mass is formed. This mass is now kneaded in a preliminary manner and worked in the first actual kneading zone by means of the kneading fingers 21.

The kneading fingers 21 can also be constructed in such a way that they produce a slight damming effect, but also a conveying action. The mass leaving the kneading zone 20 is pressed through an intermediate conveying zone 22 into a second kneading zone 23, likewise with positive guidance, by means of the screw elements 22'. The main working and kneading of the dough mass and, accordingly, the formation of the protein framework takes place in the kneading zone 23. In so doing, similar or different kneading elements can be used in the kneading zone 23, partly in an alternating manner. In its entirety, the action of the mechanical pressure and conveying forces occurs, in a particularly directed manner, at relatively very small dough portions, so that virtually no unnecessary pressure forces or friction effects occur. This is the reason why only a slight increase in temperature occurs compared with older kneading devices. At the end of the kneading zone 23, the dough mass is guided to a discharge screw 25' and through a corresponding delivery zone 25, respectively, and is fed for further processing via the discharge end 14. The shown 2-shaft kneading device has the particular advantage that it works in a self-cleaning manner to a very great degree. Depending on the design of the output end, the dough can be delivered as dough pieces or, by means of a slight constriction and corresponding pressure build-up, like strands.

In FIG. 1, the crumbly dough 13 is transferred to a fall shaft 30 directly into a screw press 31 by means of the force of gravity, wherein dough samples can be removed via a control gate 32.

However, the falling shaft can also comprise additional monitoring means or can be connected directly to such monitoring means, respectively, e.g. for monitoring the temperature. Accordingly, every process step can be monitored individually in a very favorable manner, and directed intervention can be effected immediately. A press head 33, with a corresponding shape, is located at the end of the screw press 31 of FIG. 1. A rotating cutting knife 34, e.g. for the production of short goods such as Hornli, is shown in a symbolic manner.

Figure 3:
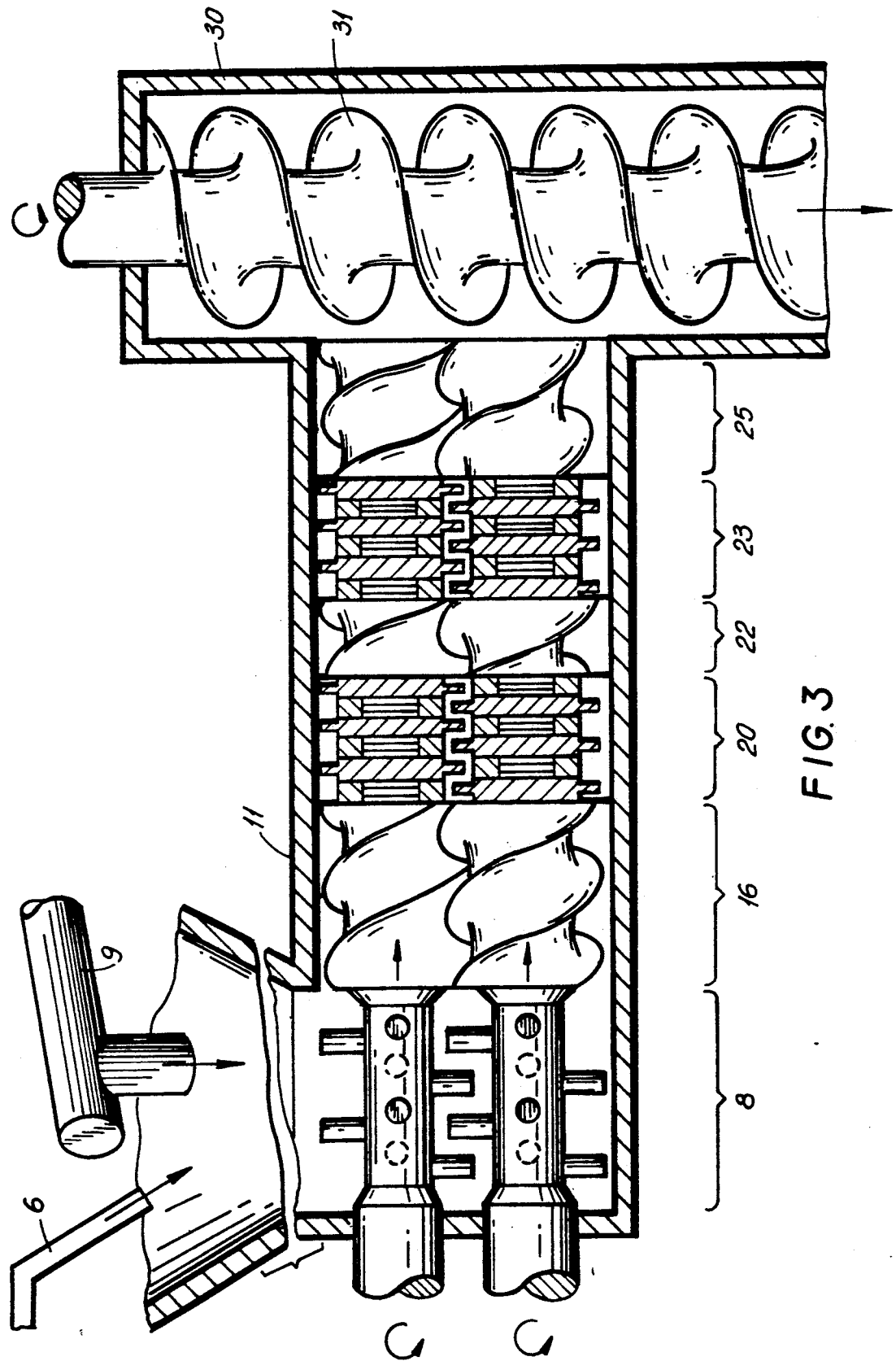
FIG. 3 shows a variant of FIG. 2 and direct transfer from the kneading stage to the molding press screw.

A variant of FIG. 2 is shown in FIG. 3. The individual working zones are designed in a manner similar to that in FIG. 2, wherein, of course, a very great multitude for the design, particularly of the kneading and working elements, is open, such as perforated disks, resistance members directed from outside to inside, pins, etc. FIG. 3 is shown in outline. The direct transfer of the crumbly dough 13 into the following screw 30, which can have a pure conveying function or can already be the actual screw press 31, as in FIG. 1, is substantial here. But it is important that the following screw 31 have a greater conveying power than the kneading device 11 so as to avoid a pressure build-up for the kneading device which can not be monitored and also so as to avoid the risk of a temperature increase which can not be monitored. The transfer of the crumbly dough from the kneading device 11 to the following screw is effected in that the conveyor screw 31 cuts off the incoming dough strand.

Figure 4:
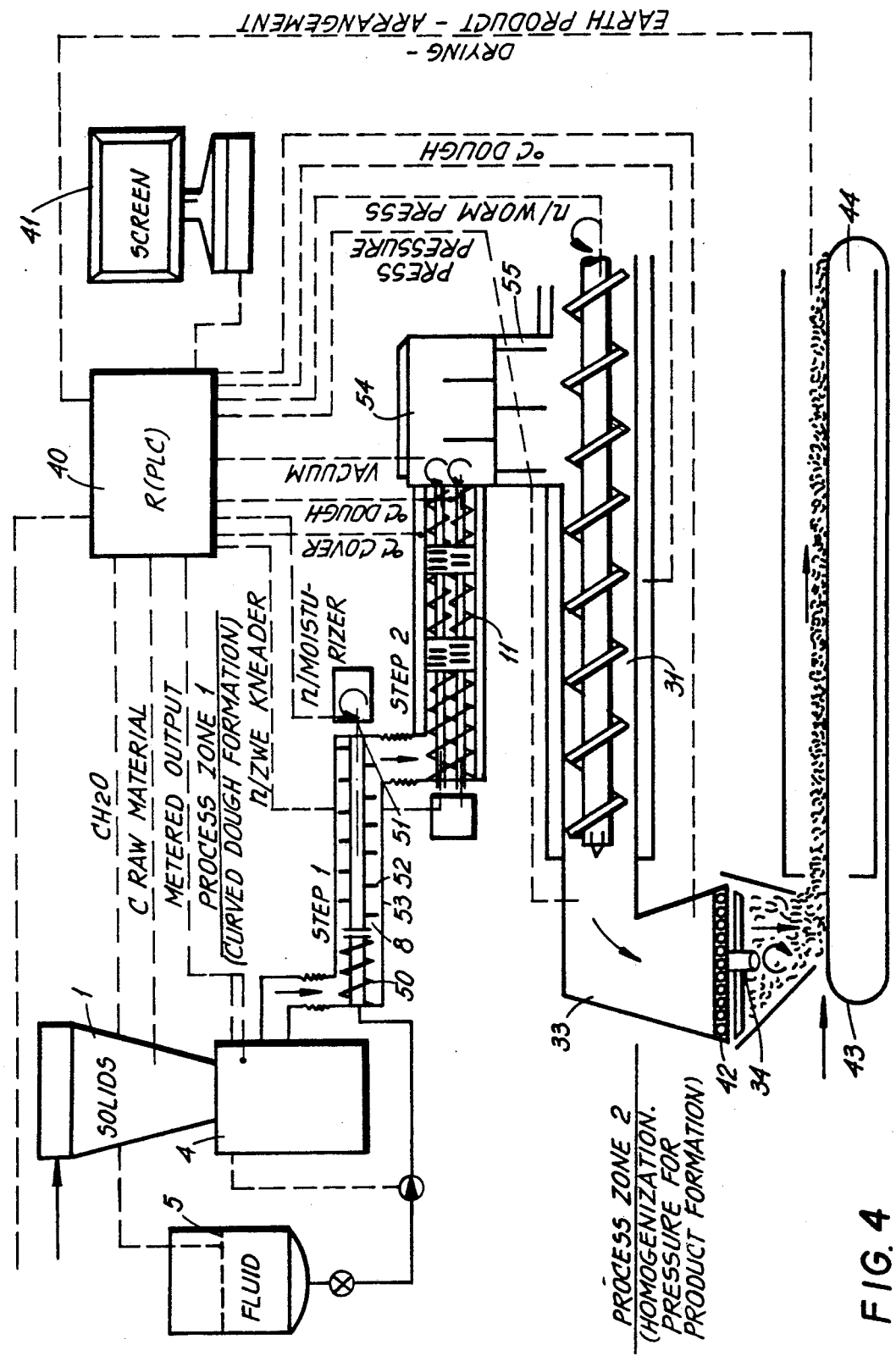
FIG. 4 shows the process sequence from the raw materials until the freshly pressed short goods in a schematic manner.

In FIG. 4, the new invention shows other installation elements comprising a computer 40 with screen 41.

The production of short paste products is also shown here, wherein the dough mass is pressed into paste products via a press head 33 and a mold 42. The cut material falls directly on a conveyor belt 43 which is guided directly into a drier or steamer 44. The processing by stages and zones, respectively, is also shown clearly in FIG. 4, wherein the crumbly dough is produced in a first process zone and, in a second process zone, the crumbly dough is processed by means of a screw press 31 at high pressure of 50-100 bar or more to form a compact homogenous dough mass and is then shaped.

The shown whirling mixer 8 has a draw-in screw 50 which rotates on a shaft 51 preferably at a speed of 200-500 revolutions per minute. However, the actual wetting and crumb formation takes place in the round housing 53 adjoining the draw-in screw 50 and is produced by means of a greater number of co-rotating whirling elements 52. The solids material is accordingly fed into the whirling mixer 8 without an actual pressing of the dry raw material. The crumbs likewise leave the whirling mixer 8 without pressing pressure in that they are guided directly into the kneading device 11 in free fall. In FIG. 4, the kneading device 11 is shown in the same way as in FIG. 2 with two kneading shafts arranged one above the other. However, in practice, there are more advantages in the majority of cases in offsetting the two kneading shafts 21 horizontally or at most only slightly vertically. The crumbs 13 leaving the kneading device enter freely into a vacuum space 54. In this case, the great advantages of the new invention for a number of practical applications are shown now in particular, because during the removal of air crumbly dough which is relatively porous, at least not yet compact, fall through the vacuum space 54, which is very efficient. A movable winder 55 can be arranged in the vacuum space 54 for reliable transfer and simultaneous reinforcement of the removal of air. All substantial parameters (temperature, moisture, climate, pressure, etc.) can be detected by means of corresponding on-line measuring devices and can be maintained so as to be optimal by means of a control system 40.

Figure 5:
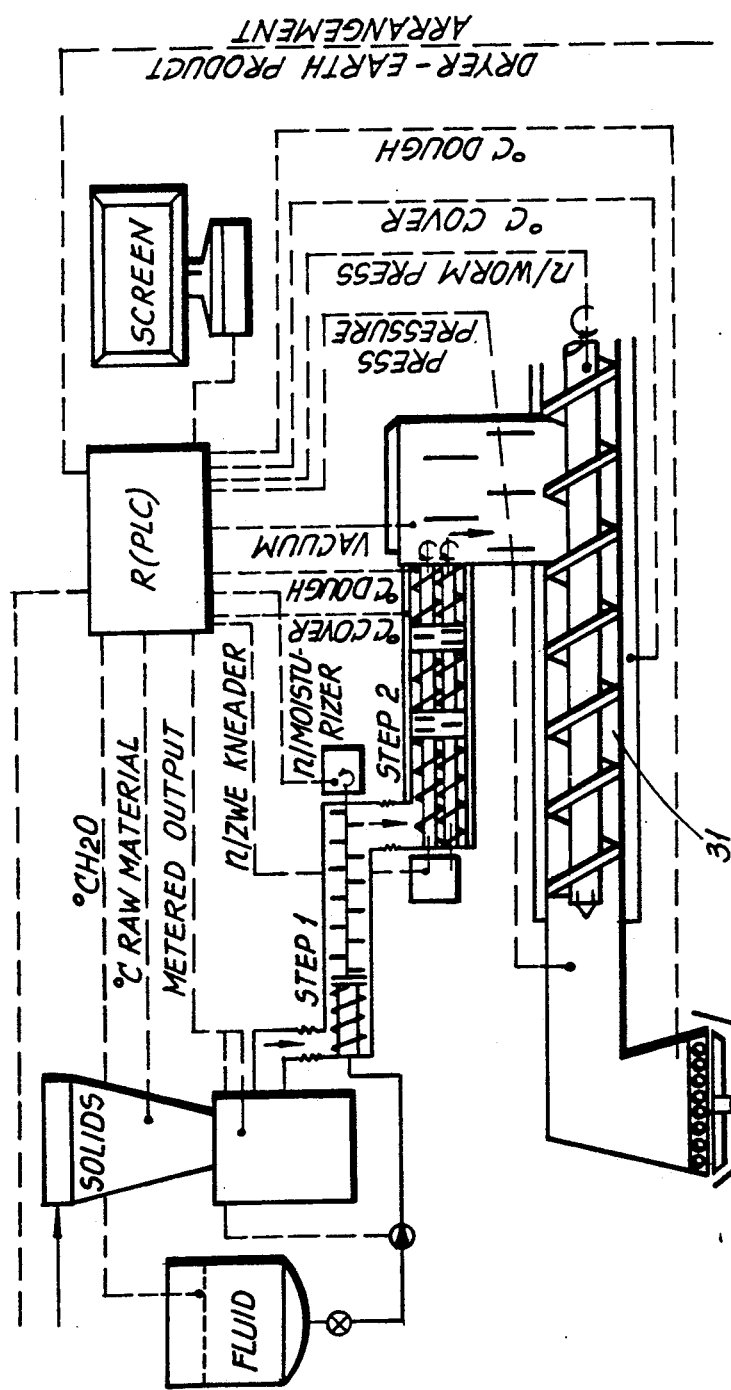
FIG. 5 shows a complete paste products line for short goods.

The solution according to FIG. 4 is shown in FIG. 5 in combination with an entire paste products line. The short goods are guided via a fall shaft 60 directly into a first oscillating preliminary drier 61 for fixing the shape of the paste product parts.

The oscillating drier 61 is usually equipped with a simple ventilation and climate installation 62, respectively. In this instance, the main drying takes place in a rotating drier 63, the so-called "rotante" 63, with a very intensive air and climate control device 64. The product is then transferred for finished drying and shape stabilization in the final drier 65 and subsequently directly to a cooling zone 66 and then to a packaging apparatus.

Figure 6:
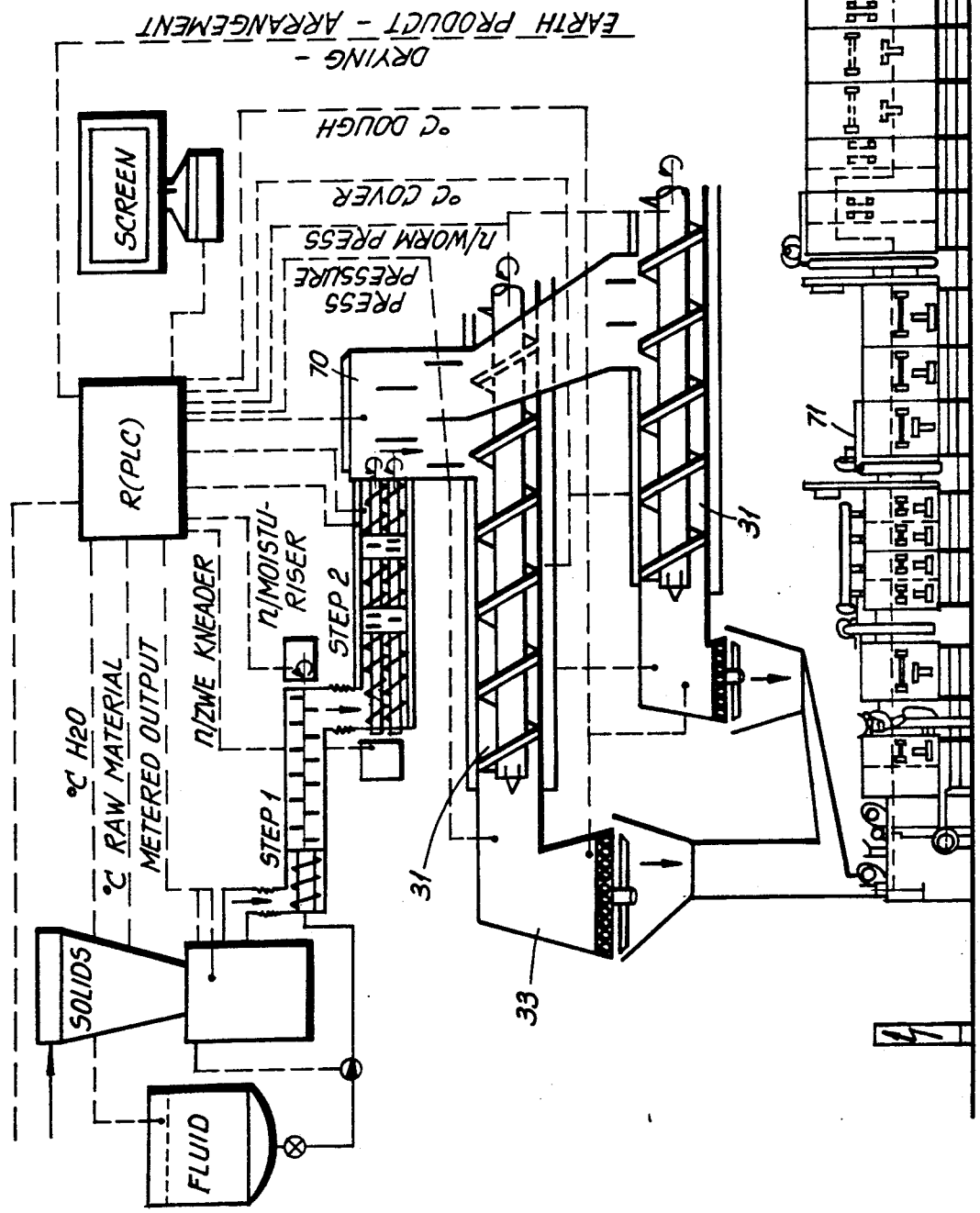
FIG. 6 shows a complete paste products line for long goods.

FIG. 6 shows another advantageous construction. Instead of a single screw press 31, two of the latter are used. The crumbly bread is transferred in a uniform manner to the two screw presses 31 by means of a distributing device 70 which can likewise adjoin a vacuum pump. In so doing, the respective feed to the individual screw presses, particularly in a new manner more than 2, can be controlled e.g. on the basis of the motor output requirement of the pressure in the press head 33.

FIG. 6 shows a typical drying line 71 for long goods with very great output.

We claim:

1. A process for the production of dough, particularly paste dough from starch and gluten protein containing raw materials, such as flour, middling or semolina, so that the dough does not substantially exceed a temperature of 50° C., and the gluten framework of the dough is fully developed, said process comprising the steps of:

moistening the raw materials briefly to a water content of 25-40%;

kneading said moistened raw materials without applying a molding pressure to form a dry dough in less than 60 seconds, whereby the gluten framework is formed in a continuous through process; and homogenizing said dough and applying pressure thereto, whereby said dough is pressed into a desired shape.

2. Process according to claim 1, in which said gluten framework is formed in said dry dough in a two shaft kneading device having two self-cleaning and positively guiding synchronously running shafts in less than 40 seconds.

3. Process according to claim 2, in which said dry dough is subjected to a cutting and kneading process by means of co-rotating cutting and kneading tools for the formation of said gluten framework.

4. Process according to claim 3 in which said dry dough is processed in said moistening and said cutting and kneading process so as to be processed in a stepwise manner having first and second stages, said moistening comprising said first stage and said kneading comprising said second stage and said dough being processed in said second stage at least during 10% with respect to time.

5. Process according to claim 2 in which said kneading device intensity can be changed and influenced by means of regulating the speed of said kneading device as a function of the current consumption of a drive motor for said kneading device.

6. Process according to claim 4 in which the temperature of the dough is measured at the end of the second stage and is regulated by means of adding a pre-selected amount of water of a corresponding temperature during moistening.

7. Process according to claim 6 in which the transfer of said dough is effected form the first into the second stage and from the second stage into a third stage without the application of pressure.

8. Process according to claim 1 in which said raw materials are moistened in a whirling mixer and a mixing rotor rotating at at least 250 revolutions per minute.

9. Process according to claim 8 in which water is added during the input into the whirling mixer and additional liquid components are fed directly into the second stage.

10. Process according to claim 2 in which liquid components are fed directly into said kneading device without preliminary mixing.

11. Process according to claim 7 in which solid or viscous additions such as tomatoes, spinach, pepperoni food products are fed directly in the second stage or directly in said third stage.

12. Process according to claim 1 in which said dry dough is fed directly into one or more screw presses and is pressed into the definitive shape with the required pressure build-up by means of a pressing mold to form a product, and the product is subsequently dried.

13. Process according to claim 2, wherein said gluten framework is formed in less than 20 seconds.

14. Process according to claim 4, in which said dough being processed in said second stage at least 30-50% with respect to time.

* * * * *